United States Patent
Laselva et al.

(10) Patent No.: US 12,192,898 B2
(45) Date of Patent: Jan. 7, 2025

(54) NETWORK ASSISTANCE INFORMATION ON UE CONTEXT RETRIEVAL LATENCY FOR ENABLING POWER SAVING

(71) Applicant: Nokia Technologies Oy, Espoo (FI)

(72) Inventors: Daniela Laselva, Klarup (DK); Mads Lauridsen, Gistrup (DK); Ahlem Khlass, Nozay (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 401 days.

(21) Appl. No.: 17/772,337

(22) PCT Filed: Nov. 1, 2019

(86) PCT No.: PCT/EP2019/079980
§ 371 (c)(1),
(2) Date: Apr. 27, 2022

(87) PCT Pub. No.: WO2021/083531
PCT Pub. Date: May 6, 2021

(65) Prior Publication Data
US 2022/0377665 A1 Nov. 24, 2022

(51) Int. Cl.
*H04W 52/02* (2009.01)
*H04W 76/27* (2018.01)

(52) U.S. Cl.
CPC ....... *H04W 52/0216* (2013.01); *H04W 76/27* (2018.02)

(58) Field of Classification Search
CPC . H04W 76/27; H04W 76/19; H04W 36/0033; H04W 52/0216; H04W 60/04; H04W 60/00; H04W 76/10; Y02D 30/70
See application file for complete search history.

(56) References Cited

U.S. PATENT DOCUMENTS

2019/0059051 A1* 2/2019 Åström ............... H04W 52/028
2019/0335397 A1* 10/2019 Ganesan ........... H04W 52/0235

FOREIGN PATENT DOCUMENTS

WO  WO 2018/137583 A1  8/2018
WO  WO 2019/202516 A1  10/2019

OTHER PUBLICATIONS

Ryoo et al., "Energy Efficiency Enhancement with RRC Connection Control for 5G new RAT", 2018, IEEE Wireless Communications and Networking Conference, 6 pages. (Year: 2018).*

(Continued)

*Primary Examiner* — Quoc Thai N Vu
(74) *Attorney, Agent, or Firm* — LIPPES MATHIAS LLP

(57) ABSTRACT

A terminal device, initially, maintains, in at least one memory, a configuration for a Radio Resource Control, RRC, inactive state. The configuration includes information on a radio access network notification area, RNA. The terminal device, then, acquires information on an expected latency of incoming RRC messages within the RNA. In response to triggering a RRC connection resume procedure, the terminal device performs the following: First, the terminal device transmits a RRC connection resume request to a target access node and starts a timer defined based on the expected latency. In response to the timer expiring, the terminal device initiates monitoring of incoming RRC messages. In response to receiving a RRC connection resume message, the terminal device initiates the RRC connected state.

15 Claims, 11 Drawing Sheets

(56) References Cited

OTHER PUBLICATIONS

Da Silva et al., "Meeting 5G Latency Requirement", Jun. 2019, Ericsson Technology Review, 11 pages. (Year: 2019).*
3GPP Tsg SA WG2 Meeting #123, Ljubljana, Solvenia, Oct. 23-27, 2017, S2-177245, "On Xn and RRC Inactive", Nokia, Nokia Shanghai Bell, 5 pgs.
3GPP TSG SA WG2#124, Reno, USA, Nov. 27-Dec. 1, 2017, S2-178756, "Retrieval of UE Context", Nokia, Nokia Shanghai Bell, Qualcomm, 3 pgs.
3GPP TSG-RAN WG3#99bis, Sanya, China, Apr. 16-20, 2018, R3-181980, "Full UE Context Transfer", Nokia, Nokia Shanghai Bell, 5 pgs.
3GPP TSG-RAN WG3 Meeting #100, Busan, Korea, May 21-25, 2018, R3-182616, "UE Context Retrieval when UE moves out of RNA", Nokia, Nokia Shanghai Bell, 5 pgs.
3GPP TSG-RAN WG3 Meeting #100, Busan, Korea, May 21-25, 2018, R3-183559, "Baseline CR for June Version of RAN2 TS 38.300 (RAN3 part) covering agreements of RAN3#99Bis", Nokia, Nokia Shanghai Bell, 14 pgs.

* cited by examiner

NETWORK ASSISTANCE INFORMATION ON UE CONTEXT RETRIEVAL LATENCY FOR ENABLING POWER SAVING

CROSS REFERENCE TO RELATED APPLICATION

This patent application is a U.S. National Stage application of International Patent Application Number PCT/EP2019/079980 filed Nov. 1, 2019, which is hereby incorporated by reference in its entirety.

TECHNICAL FIELD

The various example embodiments relate to communications.

BACKGROUND

The fifth generation cellular systems (5G) aim to improve the through-put by a huge factor (even up to 1000 or more), which provides a multitude of challenges, especially considering the scarcity of spectrum at low frequency bands and the need for supporting a very diverse set of use cases. In order to reach this goal, it is important to exploit the higher frequencies such as millimeter wave frequencies in addition to the more conventional lower frequencies. To meet the demands of 5G systems, a new, globally standardized radio access technology known as New Radio (NR) has been proposed with the first specification released at the end of 2017. One proposed feature of the New Radio technology is the inclusion of a new independent Radio Resource Control (RRC) state, referred to as RRC inactive. RRC inactive state complements the two existing states, RRC connected and RRC idle, with the goal of lean signalling and energy-efficient support of NR services. However, the RRC inactive state is not, as of yet, fully optimized in terms power consumption and thus improvements in this area are feasible.

BRIEF DESCRIPTION

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following, exemplary embodiments will be described with reference to the attached drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1A:
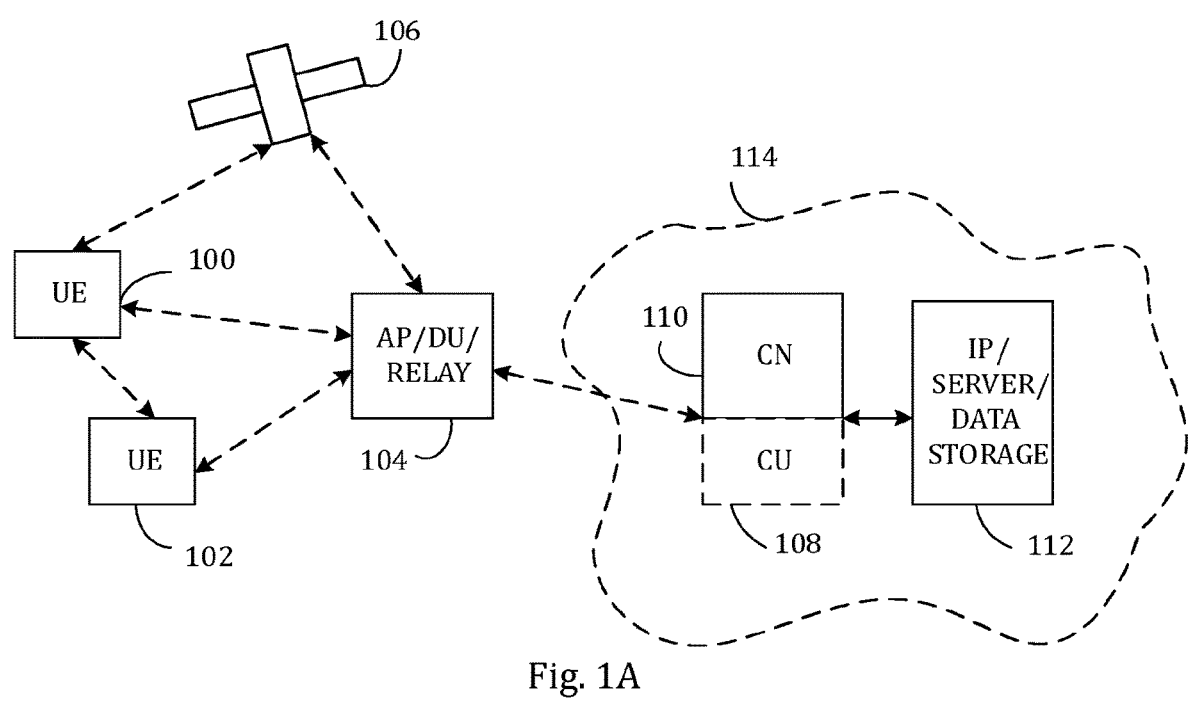
FIGS. 1A and 1B illustrate wireless communication scenarios to which embodiments may be applied.

FIG. 1A depicts examples of simplified system architectures only showing some elements and functional entities, all being logical units, whose implementation may differ from what is shown. The connections shown in FIG. 1A are logical connections; the actual physical connections may be different. It is apparent to a person skilled in the art that the system typically comprises also other functions and structures than those shown in FIG. 1A.

The embodiments are not, however, restricted to the system given as an example but a person skilled in the art may apply the solution to other communication systems provided with necessary properties.

The example of FIG. 1A shows a part of an exemplifying radio access network.

FIG. 1A shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

It should be understood that, in FIG. 1A, user devices are depicted to include 2 antennas only for the sake of clarity. The number of reception and/or transmission antennas may naturally vary according to a current implementation.

Additionally, although the apparatuses have been depicted as single entities, different units, processors and/or memory units (not all shown in FIG. 1A) may be implemented.

5G enables using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being integratable with existing legacy radio access technologies, such as the LTE. Inte-gration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1A by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

Figure 1B:
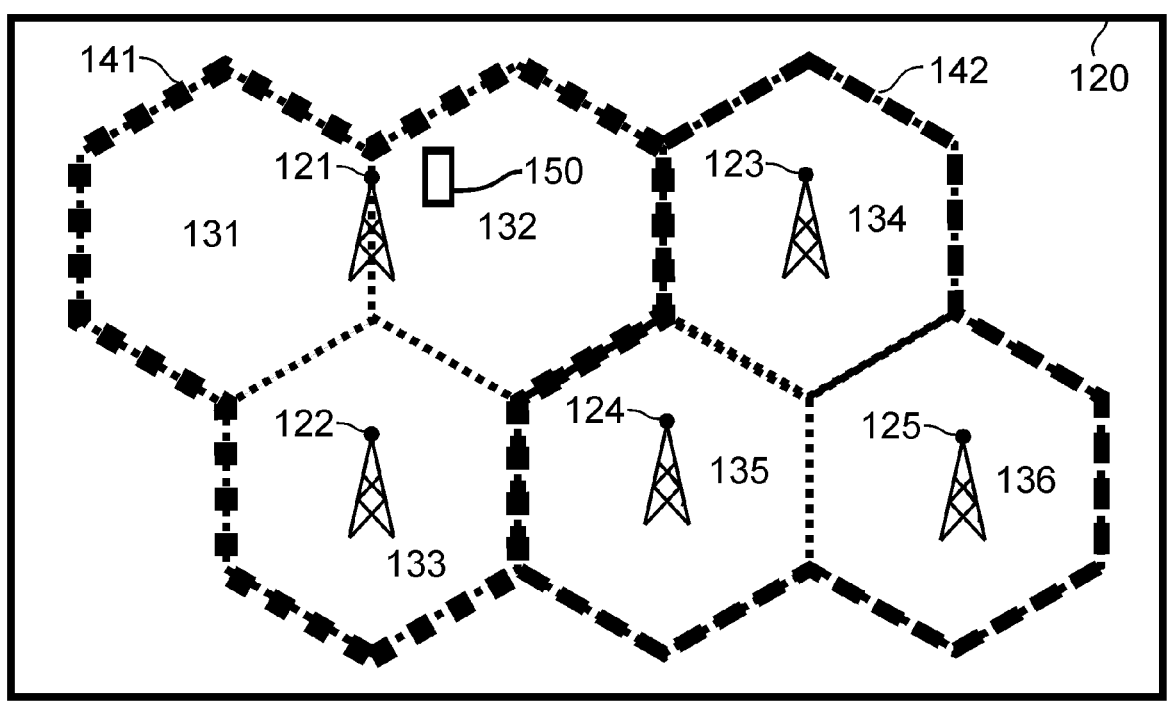

It is obvious for a person skilled in the art that the depicted system is only an example of a part of a radio access system and in practice, the system may comprise a plurality of access nodes such as (e/g)NodeBs (as is illustrated in FIG. 1B), the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1A may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1A). A HNB Gateway (HNB-GW), which is typically installed within an operator's network may aggregate traffic from a large number of HNBs back to a core network.

As mentioned above, one suggested feature of the future 5G communications systems is the so-called 5G New Radio. 5G New Radio refers to a new global 5G standard for an orthogonal frequency-division multiplexing (OFDM)based air interface designed to fit the more stringent requirements of the 5G systems (for example, providing different types of services to a huge number of different types of devices operating over a wide frequency spectrum). The 5G New Radio shall be able to allow network deployment with minimized manual efforts and as automated self-configuration as possible.

One of the features proposed for 5G New Radio (or specifically NR Rel-15) in order to reach said requirements is a new independent Radio Resource Control (RRC) state called RRC inactive (or equally "RRC_INACTIVE"). RRC inactive complements the two existing states, RRC connected (or RRC_CONNECTED) and RRC idle (or RRC_IDLE), with the goal of lean signalling and energy-efficient support of NR services. A terminal device is either in the RRC connected state or in the RRC inactive state when a RRC connection has been established. If no RRC connection has been established for the terminal device, the terminal device is in a RRC idle state. Although, the design was conceived particularly for massive Machine Type Communications (mMTC) and Massive Internet of Things (MIoT) services, it may be beneficial to efficiently deliver small and/or infrequent traffic of enhanced Mobile Broadband (eMBB) and/or Ultra-Reliable Low-Latency Communication (URLLC) services as well. The RRC states may be equally called RRC modes.

The RRC inactive state enables a terminal device to quickly resume the RRC connection and start the transmission of small and/or sporadic data with a much lower initial access delay and associated signalling overhead as compared to the RRC idle state (by allowing a faster transition to RRC connected state having ~10 ms control plane delay). This is achieved mainly thanks to reduced control signalling required for requesting and obtaining the resume of a suspended RRC connection, which results in power saving in the terminal device. At the same time, a terminal device in RRC inactive is able to achieve similar power savings as in the RRC idle state, benefiting from, e.g., a much larger period of physical downlink control channel (PDCCH) monitoring (e.g., for paging) and relaxed measurements (e.g., Radio Resource Management, RRM, measurements for cell (re-)selection) compared to the RRC connected state. Furthermore, compared to keeping the terminal device in the RRC connected state, the new state minimizes mobility signalling both to RAN (e.g., RRC measurement reporting, handover messages) and to the core network (e.g. to/from the Core Access and Mobility Management Function (AMF)) since the terminal device is still in a Connection Management (CM) connected state. A terminal device in the RRC inactive state is able to move within an area configured by an access node without any notification (i.e., within a RAN Notification Area (RNA)) and using a unique identifier: Inactive-Radio Network Temporary Identifier (I-RNTI). This RNA may cover one or more cells and may be contained within the core network registration area. A RAN-based notification area update (RNAU) procedure is run by the terminal device periodically and in response to the terminal device re-selecting to a cell that does not belong to the configured RNA.

When a terminal device is moved to the RRC inactive state using a RRC Connection Release message with a SuspendConfig field (received by the terminal device), the terminal device access stratum (AS) context (equally called UE Inactive AS Context or simply terminal device context or UE context), necessary for the quick resume of the RRC connection, is maintained both at the terminal device side and RAN side. It is noted that at the resume the terminal device is identified by the I-RNTI. The terminal device (AS) context comprises, for example, bearer configuration parameters according to the latest RRC configuration and AS security context pointing to the integrity protection and ciphering algorithms and the AS security keys. Based on the latter, the terminal device is capable of deriving the (short) Message Authentication Code—Integrity (MAC-I) field, to be used as an authentication token, and is included in the request message the terminal device in the RRC inactive state sends to the network when it wants to send signalling or data, or in response to receiving a paging message.

In the context of the embodiments to be discussed below, the mobility procedures in the RRC inactive state are relevant. Therefore, further details of these operations are provided in the following.

RRC inactive is a state where a terminal device remains in a CM connected state and is able to move within an area configured by the access node (i.e., within the RNA) without notifying the access node, i.e., cell reselections of the terminal device within the RNA are transparent to the network.

In RRC inactive state, the (last) serving access node (equally called an anchor access node) maintains, in at least one memory, the terminal device (UE) context (i.e., at least the UE AS context) and keeps the terminal device—associated NG connection with the serving AMF and UPF (User Plane Function). The terminal device also maintains, in at least one memory, its own terminal device context.

If the terminal device accesses an access node within the RNA other than the last serving access node (anchor access node), the receiving access node triggers the Xn Application Protocol (XnAP) Retrieve UE Context procedure to retrieve the terminal device context (UE context) from the last serving access node, becomes the serving access node and it may further trigger the NG Application Protocol (NGAP) Path Switch procedure upon context relocation and applicable RRC procedures. After the path switch procedure, the serving gNB triggers release of the terminal device context at the last serving gNB by means of the XnAP UE Context Release procedure, i.e. anchor node relocation.

When the terminal device crosses the RNA borders (thus reselecting to a cell outside the current RNA), a RNA update procedure (RNAU) is to be triggered (via a RRC connection resume request with cause value equal to RNAU).

As described above, if the terminal device accesses an access node other than the last serving access node, the receiving access node triggers the XnAP Retrieve UE Context procedure to get the terminal device context from the anchor access node. Essentially, the XnAP UE Context retrieval procedure comprises transmitting a context retrieve request from a new access node to the last serving access node (upon resolving the latter based on the I-RNTI of the UE) and subsequently a context retrieve response comprising the terminal device context from the last serving access node to the new access node. Such a context retrieval procedure will result in additional latency since the RRC connection resume message for switching to the RRC connected state transmitted from the new access node to the terminal device may be sent to the terminal device only after the terminal device context is successfully received. The introduced latency will be primarily caused by the Xn latency (i.e., latency in the XnAP Retrieve UE Context procedure), whereas the network processing delays, (e.g., processing of a RRC connection resume request before performing the XnAP Retrieve UE Context procedure and processing of the context retrieve response) may be negligible or at least relatively small. Assuming a one-way Xn latency of 20 ms, the total latency for the retrieval of the terminal device context from the last serving access node will be at least 40 ms.

As the terminal device is unaware of the latency associated with the context retrieval procedure, it is currently required to monitor for incoming RRC messages continuously in order to ensure the successful reception of the RRC connection resume message, thus it is unable to benefit from light or micro sleep states while waiting for the RRC connection resume message, which, in turn, causes the terminal device to consume more power than is necessary. The embodiments to be discussed below seek to reduce said power consumption of terminal device by providing network assistance information to the terminal device.

FIG. 1B illustrates another example of a communications system 120 (or a part thereof) to which some embodiments may be applied. The communications system 120 may correspond to a more detailed view of some aspects of the communication system as discussed in relation to FIG. 1A. FIG. 1B may specifically correspond to a communications system where at least some of the terminal devices 150 are configured so as to be able use the RRC inactive state (as defined above).

Referring to FIG. 1B, the communications system 120 comprises two adjacent RAN Notification Areas (RNAs) 141, 142. As mentioned above, a RNA is an area inside which a terminal device in the RRC inactive state is able to move without any notification and using a unique identifier: Inactive-Radio Network Temporary Identifier (I-RNTI). The first RNA 141 (denoted with a thick dotted line) comprises two access nodes 121, 122 (e.g., eNodeBs or gNodeBs) serving, respectively, cells 131, 132 and a cell 133. The second RNA 142 (denoted with a thick dashed line) comprises three access nodes 123, 124, 125 (e.g., eNodeBs or gNodeBs) serving, respectively, cells 134, 135, 136 (i.e., each serving only a single cell). In general, each RNA may comprise one or more access nodes each of which serves one or more cells. Each access node 121 to 125 may correspond to the access node 104 of FIG. 1A and/or may be defined to have any of the functionalities described above or in connection with embodiments.

At any given time instance, each cell 131 to 136 may comprise one or more terminal device or zero terminal devices served by corresponding access nodes 121 to 125. In FIG. 1B30, only a single terminal device 150 is shown for simplicity of presentation. Each terminal device 150 may correspond to any of the terminal devices 100, 102 of FIG. 1A and/or may be defined to have any of the functionalities described above or in connection with embodiments.

Figure 2:
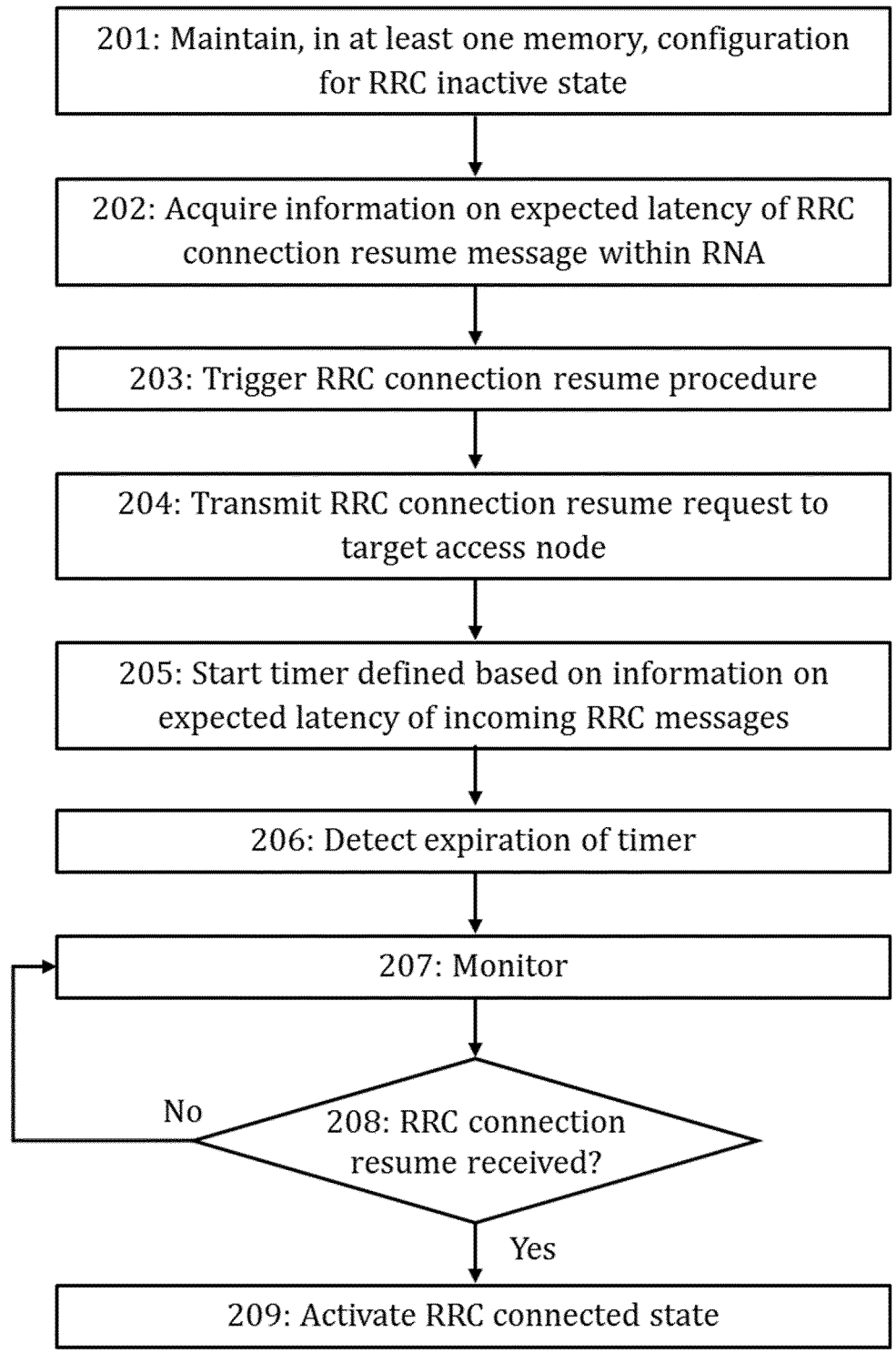
FIGS. 2 to 8 illustrate processes according to embodiments.

FIG. 2 illustrates a process according to embodiments for performing a transition of a terminal device from a RRC inactive state to a RRC connected state in a way that minimizes the power consumption of the terminal device. The illustrated process may be performed by a terminal device or more specifically either of the terminal devices 100, 102 of FIG. 1A or the terminal device 150 of FIG. 1B.

Referring to FIG. 2, the terminal device initially maintains, in block 201, in at least one memory, a configuration for a RRC inactive state of the terminal device. Said configuration comprises at least information on a radio access network notification area (RNA) assigned for the terminal device. The information on the RNA may comprise, for example, a list of cells configured as part of said RNA and/or a list of RAN-area codes (RANAC) associated with said RNA. Said configuration may also comprise information on an anchor access node (i.e., the last serving access node) of the terminal device. The information on the anchor access node information may be implicitly based on the I-RNTI that was assigned by the anchor access node. The information on the anchor access node is information enabling or facilitating the terminal device to identify the anchor access node.

The terminal device may be, initially, in the RRC connected state or in the RRC inactive state. The terminal device may be located within an anchor cell provided by the anchor access node.

The terminal device acquires, in block 202, information on an expected latency of incoming RRC messages within the RNA. The acquiring in block 202 may specifically comprise receiving the information on the expected latency from an anchor access node when the terminal device is in the RRC connected state (e.g., as a part of a RRC connection release message or specifically as a part of the configuration for the RRC inactive state of the terminal device comprised in said RRC connection release message) or determining said expected latency, by the terminal device itself, based on history information relating to latency of received RRC messages (e.g., received RRC connection resume messages) maintained in said at least one memory of the terminal device. These two alternatives are described in more detail in relation to FIGS. 3 and 8, respectively.

The information on the expected latency of the incoming RRC messages within said RNA may be defined in multiple different ways. Firstly, the expected latency of the incoming RRC messages may correspond to an expected latency associated with one or more different RRC (response) messages (i.e., different types of RRC messages) which may be received upon transmitting a RRC connection resume request to an access node. Said one or more different RRC messages may comprise, for example, a RRC connection resume message, a RRC connection release message and/or a RRC setup message. In other words, the expected latency may correspond to a latency expected in receiving, by the terminal device, a RRC message of a particular type or types or a latency expected in receiving, by the terminal device, any RRC (response) message. If said one or more different messages comprise multiple different types of RRC messages, the expected latency may correspond, for example, to an average or a weighted average (e.g., weighted by popularity of a particular message type) of the expected latencies of different RRC message types.

In some embodiments, the expected latency of the incoming RRC messages within the RNA corresponds specifically to an expected latency of a RRC connection resume message within the RNA. In other embodiments, the expected latency of the incoming RRC messages corresponds an expected latency of two or more different RRC messages consisting of a RRC connection resume message and at least one of a RRC connection release message and a RRC setup message within the RNA. It should be noted that even if the expected latency corresponds only to an expected latency of a certain type of RRC message (e.g., a RRC connection resume message), said expected latency may be applicable to other RRC message types which may be received since the timing of an access node in transmitting a RRC response message may be primarily dictated by the Xn latency for acquiring the terminal device context.

Irrespective of what types of RRC messages are taken into account in the expected latency, the information on the expected latency of the incoming RRC messages may comprise one or more values of expected latency of, each of which may correspond to a particular cell, groups of cells, an anchor cell or a non-anchor cell. Different ways of defining the information on the expected latency of the incoming RRC messages are discussed in more detail following the discussion of the whole process of FIG. 2.

The terminal device triggers, in block 203, an RRC connection resume procedure of the terminal device. Specifically, the terminal device may trigger, in block 203, a switch from the RRC inactive state to a RRC connected state. At this moment, the terminal device may still be within the RNA. For example, the triggering in block 203 may correspond to the terminal device determining a need for a RRC connection resume, e.g., due to a change in the selected access node, due to a change in the assigned RNA, due to a presence of uplink data in the terminal device, in response to being paged by the RAN, in response to a periodic RNAU or in response to an event-triggered RNAU triggered, e.g., due to a change in a camping cell. Said need for a RRC connection resume may be due to a need for uplink data transfer or due to the terminal device being paged for downlink data.

In response to the triggering in block 203, the terminal device, first, transmits, in block 204, a RRC connection resume request to a target access node (i.e., to the access node which is currently serving the terminal device). The RRC connection resume request may comprise information identifying the terminal device (or user equipment) and the anchor access node such as the I-RNTI allocated by the anchor access node. A terminal device context retrieval procedure (or specifically XnAP Retrieve UE Context procedure) is performed between the target access node and the anchor access node in response to the target access node receiving the RRC connection resume request. In said terminal device context retrieval procedure, the target access node transmits a context retrieve request (requesting terminal device context of said terminal device) to the anchor access node (based on the I-RNTI) which in response to receiving the context retrieve request, transmits a context retrieve response comprising the terminal device context (i.e., the UE context) of said terminal device. As mentioned above, this context retrieval procedure is typically associated with a considerable latency or delay (e.g., at least 20 ms). The context retrieval is illustrated and discussed in more detail in relation to FIG. 6.

Directly following the transmission in block 204, the terminal device starts, in block 205, a timer defined based on the information on the expected latency of the incoming RRC messages. Specifically, the timer may be defined to have an expiration time which corresponds to a value of the expected latency of the incoming RRC messages or a value of the expected latency of the RRC connection resume message. If multiple values of the expected latency of the incoming RRC messages are defined for the RNA, the value of the expected latency of the RRC connection resume to be used for the timer may be determined based on a current location of the terminal device within the RNA, for example, based on the cell or groups of cells where the terminal device is currently located and/or a curs rent beam of the terminal device and/or whether or not the terminal device still served by the anchor access node. Regarding the last option, the timer may be set to expire much faster if the terminal device still served by the anchor access node (as the terminal device context may be already available for the anchor access node and thus transmission of the RRC connection resume message or other RRC message may occur much sooner after the RRC connection request, i.e., no context retrieval is performed). While the timer is running, the terminal device is not monitoring for incoming RRC messages as no RRC connection resume message is expected to be received at this time due to the inherent latency in the terminal device context retrieval procedure. In other words, the terminal device is not attempting to receive the RRC connection resume message which is typically scheduled on the PDCCH and transmitted on the PDSCH. While the timer is running, the terminal device may specifically be in a low power mode or specifically in a sleep mode such as (e.g., a micro sleep mode, light sleep mode or a deep sleep mode), e.g., without monitoring PDCCH for a downlink assignment, as is described in more detail in relation to FIG. 4.

In some embodiments, the timer may be defined specifically based on information on the expected latency of the RRC connection resume message.

The timer may be, for example, a resume discontinuous reception (DRX) timer. In discontinuous reception (DRX), a terminal device is configured (by the network) to only discontinuously monitor the PDCCH (i.e., monitoring the PDCCH according to the timer as it should indicate the scheduling of RRC messages). The DRX is used, e.g., for discontinuous paging monitoring in RRC idle or inactive state and for discontinuous scheduling assignments monitoring in RRC connected state. The DRX relies on a periodic pattern of active time with monitoring occasions combined with potential sleep time (i.e., time in which the terminal device could potentially move to a sleep state). The DRX scheme is semi-statically configured through RRC messaging. Conventionally, the DRX is suspended during RRC state transition phases. In this context, the terminal device may only apply the DRX sleep period according to the timer once after which it needs to continuously monitor the PDCCH for receiving the resume message.

In response to the timer expiring (or the detection of the expiration of the timer) in block 206, the terminal device initiates (or resumes), in block 207, monitoring of incoming RRC messages. In other words, the monitoring is, instead of starting the monitoring right after the transmission of the RRC connections resume request in block 205, delayed so as to reduce the power consumption of the terminal device by eliminating the redundant monitoring period when no RRC connection resume message is expected to be received.

Specifically, the terminal device may initially monitor, in block 207, the PDCCH to determine whether a RRC message (here namely, a RRC connection resume message) is scheduled on the Physical Downlink Shared Channel (PDSCH). Upon determining that a RRC message is scheduled on the PDSCH, the terminal device monitors, in block 207, the PDSCH for receiving said RRC message according to the scheduling assignment.

In response to receiving a RRC connection resume message from the target access node in block 208, the terminal device activates, in block 209, a RRC connected state of the terminal device. As mentioned above, the RRC connection resume message may be specifically received via the PDSCH. The monitoring in block 207 is continued until the reception of the RRC connection resume message in block 208 (as indicated by the arrow from 208 (no) back to block 207). It should be noted that blocks 208, 209 may be omitted in some embodiments as the terminal device may alternatively receive, during the monitoring, another RRC message, for example, a RRC setup message for RRC connection establishment or a RRC connection release message, as will be discussed in detail in relation to FIG. 8.

As mentioned above, the information on the expected latency of the incoming RRC messages within said RNA acquired in block 202 may be defined in multiple different ways. In some simple embodiments, the information on the expected latency of the incoming RRC messages may consist of a single value of the expected latency of the incoming RRC messages. This single value is to be used for the whole RNA, irrespective of which target cell within the RNA the terminal device attempts resuming the connection to. In some such embodiments, the value of the expected latency of the incoming RRC messages may correspond to a minimum value of Xn round-trip time associated with any two access nodes in the RNA or a sum of processing delays and Xn round-trip time associated with any two access nodes in the RNA. Alternatively, the value of the expected latency of the incoming RRC messages may correspond to an exact value indicating an exact time at which the terminal device expects the resume message response. Specifically, the exact value may be defined by the longest Xn round-trip time (i.e., slowest Xn connection) between any two access nodes in the RNA. This would entail the access nodes on a fast Xn connection needing to withhold the RRC connection resume message until said exact time has expired.

In other embodiments, the information on the expected latency of the incoming RRC messages may comprise a separate value of the expected latency for each of one or more cells of the RNA or, assuming that the RNA comprises one or more groups of cells (e.g., according to the RANAC), for each of said one or more groups of cells. Each group of cells may comprise one or more cells. Said separate values may, in some embodiments, be the same for at least some of the cells or groups of cells. In some embodiments, one or more cell-specific values of the expected latency and one or more cell-group-specific values of the expected latency may be defined.

Additionally or alternatively, the information on the expected latency of the incoming RRC messages may be defined differently for one or more anchor cells (i.e., one or more cells provided by the anchor access node) and for one or more non-anchor cells. In other words, the information on the expected latency of the incoming RRC messages may comprise one or more values of the expected latency for one or more anchor cells (i.e., one or more cells provided by the anchor access node) and one or more values of the expected latency for one or more non-anchor cells of the RNA. The one or more values of the expected latency for the one or more anchor cells may preferably be smaller than the one or more values of the expected latency for the one or more non-anchor cells. Before starting the timer, the terminal device may determine whether it is still served by the anchor access node and subsequently define the timer based on the information on the expected latency of the incoming RRC messages taking into account whether or not the terminal device is served by the anchor access node. The reason for such a configuration is that the anchor access node already has the terminal device context at hand and thus it only needs to process the RRC connection resume request from the terminal device and prepare the RRC connection resume message.

Additionally or alternatively, the information on the expected latency of the incoming RRC messages may be defined on a per-cell or per-cell group basis for non-anchor cells (i.e., one or more cells which are not associated with the anchor access node of the terminal device), whereas the expected latency value for any cells of the anchor access node may be defined separately. In one embodiment, a single value is defined for cell(s) of the anchor access node. Furthermore, such a value may be pre-configured to the terminal device. The reason for such a configuration is that no context retrieval procedure may be required when resuming within the anchor access node. The terminal device is also capable of distinguishing whether a resume cell belongs to the anchor access node or not. For instance, the terminal device knows whether it is resuming to a cell that belongs to the anchor access node or not, based on I-RNTI (comprising an indication of an anchor access node identifier) and the resume Cell Identity (that would be indicative of the target access node since the leftmost bits of the NR Cell Identity information element (IE) correspond to the access node identifier). This knowledge may be helpful in reducing the network signaling for providing latency values to the terminal device that are applicable within the RNA. In the former case, it will apply the single value of the expected latency. In the latter case, it will apply the corresponding value.

Any combination of the above definitions may also be considered. Also in the above definitions, the incoming RRC messages for which the expected latency may correspond to one type of RRC message (e.g., a RRC connection resume message) or multiple types of RRC messages, as discussed in relation to block 202. The expected latency may be also defined with a validity timer.

Figure 3:
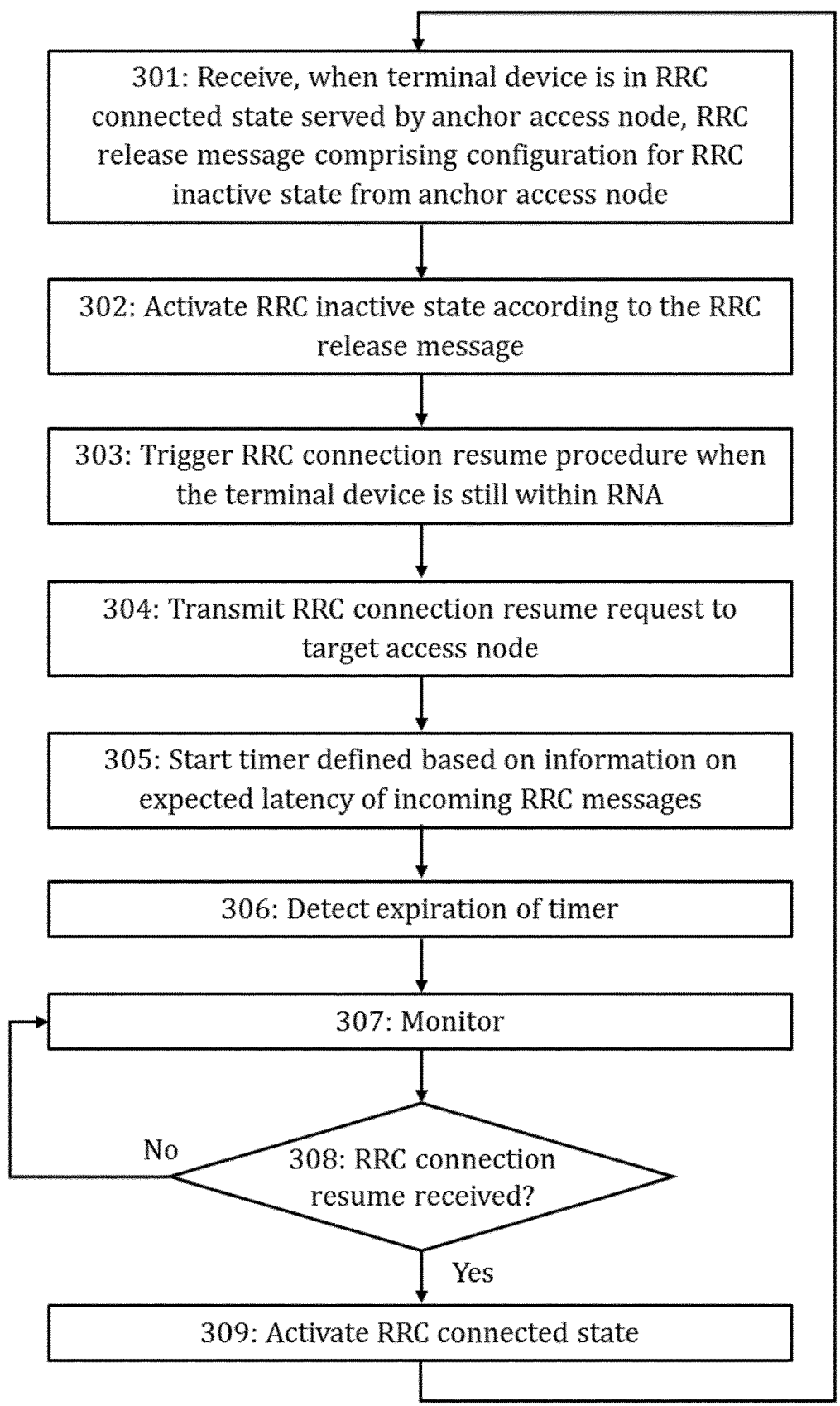

FIG. 3 illustrates another process according to embodiments for performing a transition of a terminal device from a RRC inactive state to a RRC connected state in a way that minimizes the power consumption of the terminal device. Similar to FIG. 2, the illustrated process may be performed by a terminal device or more specifically either of the terminal devices 100, 102 of FIG. 1A or the terminal device 150 of FIG. 1B.

Initially, it is assumed that the terminal device is in the RRC connected state. The terminal device may be located within an anchor cell provided by the anchor access node. The terminal device in the RRC connected state receives, in block 301, a RRC connection release message comprising, in addition to a configuration for the releasing of the RRC connection, a configuration for a RRC inactive state of the terminal device (to be used following said releasing) from the anchor access node. The RRC connection release message may comprise specifically a SuspendConfig field. The configuration for the RRC inactive state comprises at least information on a RNA assigned for the terminal device and an expected latency of incoming RRC messages (e.g., of a RRC connection resume message) within said RNA. The terminal device stores at least the received configuration for the RRC inactive state to a memory of the terminal device upon reception in block 301. The information on the RNA may comprise, for example, a list of cells configured as part of said RNA and/or a list of RAN-area codes (RANAC) associated with said RNA. The information on the expected latency of the incoming RRC messages within said RNA may be defined in multiple different ways. In general, the information on the expected latency of the incoming RRC messages comprises one or more values of expected latency of the incoming RRC messages, each of which may correspond to a particular cell, groups of cells, an anchor cell or a non-anchor cell. Different ways of defining the information on the expected latency of the incoming RRC messages are discussed in more detail following the discussion of the whole process of FIG. 3.

In some embodiments, the configuration for the RRC inactive state of the terminal device may specifically be comprised in a SuspendConfig field and/or a RAN-NotificationAreaInfo field of the RRC connection release message. The SuspendConfig field and/or the RAN-NotificationAreaInfo field may be defined as follows (the configuration for the RRC inactive state of the terminal device not shown).

| SuspendConfig field descriptions |
|---|
| ran-NotificationAreaInfo<br>Network ensures that the UE in RRC_INACTIVE always has a valid ran-NotificationAreaInfo. |

| SuspendConfig field descriptions |
|---|
| ran-PagingCycle<br>Refers to the UE specific cycle for RAN-initiated paging. Value rf32 corresponds to 32 radio frames, value rf64 corresponds to 64 radio frames and so on.<br>t380<br>Refers to the timer that triggers the periodic RNAU procedure in UE. Value min5 corresponds to 5 minutes, value min10 corresponds to 10 minutes and so on. |

| RAN-NotificationAreaInfo field descriptions |
|---|
| cellList<br>   A list of cells configured as RAN area.<br>ran-AreaConfigList<br>   A list of RAN area codes or RA code(s) as RAN area. |

After receiving the RRC connection release message in block 301, the terminal device activates, in block 302, the RRC inactive state of the terminal device according to the RRC connection release message. The RRC inactive state may be defined as described above (between discussion on FIGS. 1A and 1B). During the operation of the terminal device in the RRC inactive state, the terminal device may move within the RNA. For example, the terminal device may move to another cell of the RNA and thus potentially also select a different access node for connection. In this particular embodiment, it is assumed that the terminal device does not move beyond its current RNA though, in other embodiments, crossing the RNA borders and thus triggering a RNA update procedure (RNAU) may be possible. Before activating the RRC inactive state, the terminal device may store the terminal device context (i.e., at least UE Inactive AS context) to the memory of the terminal device. The terminal device context may have been provided to the terminal device in the RRC connection release message or in another message transmitted by the anchor access node.

Blocks 303 to 309 may correspond, respectively, to blocks 203 to 209 of FIG. 2 and are thus not repeated here for brevity.

After the activating of the RRC connected state in block 309, the process of FIG. 3 may be repeated once another RRC connection release message is received from the new anchor access node (i.e., the previous target access node), as indicated by the arrow connecting block 309 back to block 301.

Figure 4:
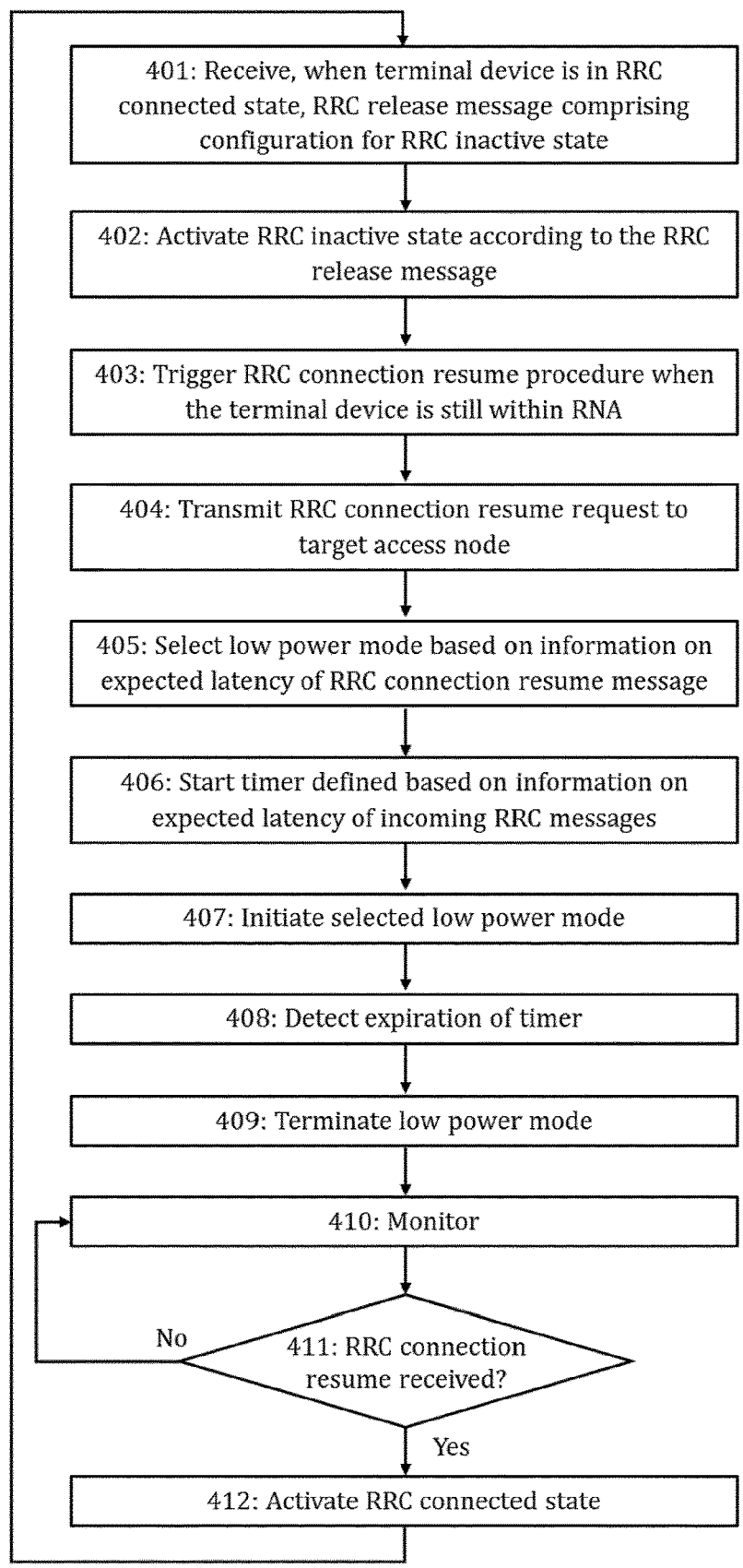

FIG. 4 illustrates another process according to embodiments for performing a transition of a terminal device from a RRC inactive state to a RRC connected state in a way that minimizes the power consumption of the terminal device. The illustrated process may be performed by a terminal device or more specifically either of the terminal devices 100, 102 of FIG. 1A or the terminal device 150 of FIG. 1B.

The process illustrated in FIG. 4 corresponds for the most part to the process of FIG. 3. Namely, blocks 401 to 404, 406, 408, 410 to 412 may correspond to blocks 301 to 309 of FIG. 3 and are thus not discussed here for brevity. Instead, the discussion is concentrated here on the new features introduced in blocks 405, 407, 409. It should be noted that said new features may be equally implemented based on the process of FIG. 2. In such embodiments, blocks 401, 402 may be replaced with blocks 201, 202 of FIG. 2 with no other changes required for the illustrated process. Thus, the following discussion concerning blocks 404 to 412 applies as such also for these embodiments.

After the RRC connection resume request has been transmitted to the target access node in block 404, the terminal device selects, in block 405, a low power mode (e.g., a sleep mode) for itself from a plurality of low power modes based on the information on the expected latency of the incoming RRC messages. Said plurality of low power modes available for the terminal device may comprise one or more sleep modes. Specifically, said plurality of low power modes may comprise one or more deep sleep modes (providing major energy savings), one or more light sleep modes (providing moderate energy savings) and/or one or more micro sleep modes (providing modest energy savings). For example, the deep, light and micro sleep modes may be defined according to the following table showing relative power averaged per slot, transition time, i.e., the total time the terminal device needs for powering ON (from sleep to active) and OFF (from active to sleep), and transition energy, i.e., energy consumed during said transition time, for the three sleep modes:

| Power state | Relative power averaged per slot (relative to the power in deep sleep) | Transition energy and transition time |
| --- | --- | --- |
| Deep Sleep | 1 | 450/20 ms |
| Light Sleep | 20 | 100/6 ms |
| Micro Sleep | 45 | 0/0 ms |
| PDCCH only | 100 | |
| PDCCH + PDSCH | 300 | |
| PUSCH | 250 (0 dBm) | |
| SSB or CSI-RS processing | 100 | |

In some embodiments, the deep, light and/or micro sleep modes may be defined to satisfy the following criteria. Regarding the deep sleep mode, the time interval for the deep sleep should be larger than the total transition time for entering and leaving the deep sleep mode (or state) though accurate timing may not be maintained. Regarding the light sleep mode, the time interval for the light sleep should be larger than the total transition time entering and leaving the light sleep mode (or state). Regarding the micro sleep mode, an immediate transition is assumed (for a power saving study purpose) from a non-sleep state to the micro sleep state or to a non-sleep state from the micro sleep state.

The selection of the low power mode in block 405 may be based on, in addition to the relevant value of the expected latency of the incoming RRC messages, on pre-defined ranges associated with each low power mode. The relevant value may correspond here, for example, a value associated with the whole RNA or with a particular cell or group of cells (following any of the definitions for the information on the expected latency of the incoming RRC messages given in relation to FIG. 3). For example, if the expected latency has a value below a first pre-defined upper threshold (e.g., 10 ms), a micro sleep mode may be selected. On the other hand, if the expected latency has a value exceeding the first pre-defined upper threshold but falling below a second pre-defined upper threshold (e.g., 20 ms), a light sleep mode may be selected. Finally, if the expected latency has a value exceeding even the second upper threshold, a deep sleep mode may be selected.

In some embodiments, a first pre-defined (non-zero) lower threshold may also be defined for the micro sleep mode.

In some embodiments, if no suitable low power mode is available for the terminal device, no low power mode may be selected. For example, if the expected latency of the incoming RRC messages is very small, it may not make sense to engage any low power mode (especially if no micro sleep mode is available in the terminal device).

In some embodiments, only a single low power mode (or specifically a single sleep mode) may be configured to the terminal device. In such embodiments, block 405 may be omitted.

Once a low power mode has been selected in block 405, the terminal device starts, in block 406, a timer which is defined based on the information on the expected latency of the incoming RRC messages, similar to as described in relation block 205 of FIG. 2. Thereafter, the terminal device initiates (or activates or engages), in block 407, the low power mode which was selected in block 405. In response to the timer expiring in block 408, the terminal device terminates, in block 409, the low power mode and starts, in block 410, monitoring the incoming RRC messages for receiving the incoming RRC messages. Blocks 411, 412 may correspond to blocks 208, 209 of FIG. 2 or blocks 308, 309 of FIG. 3 and are thus not discussed here in detail.

Figure 5:
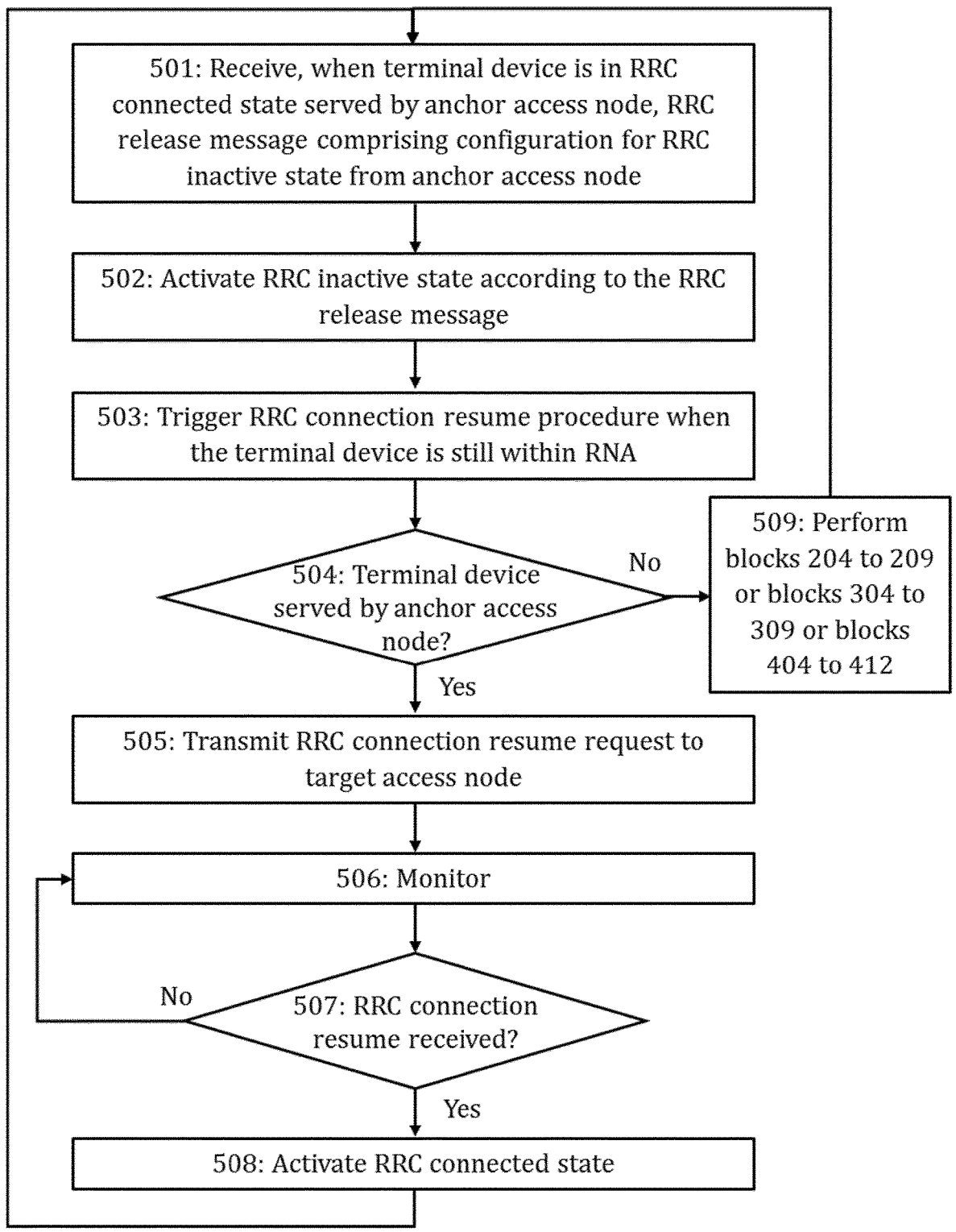

FIG. 5 illustrates another process according to embodiments for performing a transition of a terminal device from a RRC inactive state to a RRC connected state in a way that minimizes the power consumption of the terminal device. The illustrated process may be performed by a terminal device or more specifically either of the terminal devices 100, 102 of FIG. 1A or the terminal device 150 of FIG. 1B.

The process illustrated in FIG. 5 corresponds for the most part to the process of FIG. 3. Namely, blocks 401 to 404, 406, 408, 410 to 412 may correspond to blocks 301 to 309 of FIG. 3 and are thus not discussed here for brevity. Instead, the discussion is concentrated here on the new features introduced in blocks 405, 407, 409. Similar to as discussed in connection with FIG. 4, the new features introduced in FIG. 5 may be equally applied to the process of FIG. 2.

In response to the triggering of the RRC connection resume procedure (or the switch from the RRC inactive state to the RRC connected state) in block 503, the terminal device determines (or checks), in block 504, whether the terminal device is still served by said anchor access node (or by another access node).

In response to the terminal device being served by an access node other than the anchor access node in block 504, the terminal device performs, in block 509, the reconnection procedure as discussed in relation to any of the above embodiments. Specifically, block 509 may comprise blocks 204 to 209 of FIG. 2, blocks 304 to 309 of FIG. 3 or blocks 404 to 412 of FIG. 4.

In response to the terminal device being still served by the anchor access node in block 504, terminal device performs the reconnection procedure in a more conventional manner. Namely, the terminal device transmits, in block 505, the RRC connection resume request to the target access node which is, in this case, the anchor access node. In response to the transmitting in block 505, the terminal device (immediately) initiates, in block 506, monitoring for receiving the RRC connection resume message. In other words, continuous PDCCH monitoring is applied, as opposed to discontinuous PDCCH monitoring in this case. The monitoring in block 506 is initiated immediately following the transmission in block 505, that is, without starting a timer and waiting for it to expire or with a shortened delay (i.e., a delay shorter than the delay used in block 509). As the anchor access node already has the terminal device context available to it, the anchor access node only needs to process the RRC resume request message from the terminal device and prepare the RRC connection resume message. This means that the latency between the transmission of the RRC connection resume request and the reception of the RRC connection resume message is quite small. Blocks 506 to 508 may be carried out as described in relation to blocks 207 to 209 of FIG. 2.

Figure 6:
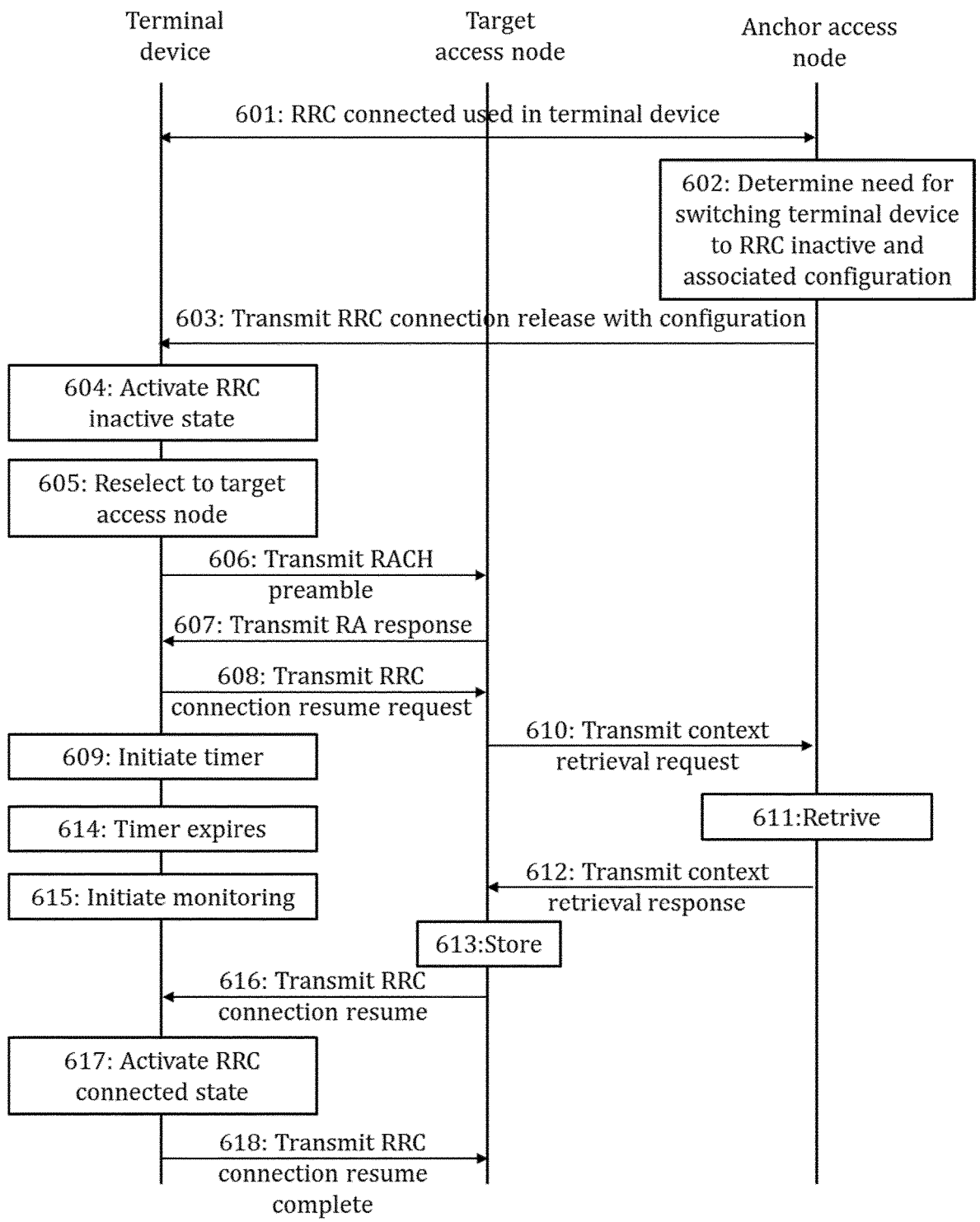

FIG. 6 is a signaling diagram illustrating signaling between a terminal device, an anchor access node and a target access node (which is not the anchor access node). Similar to previous flow charts illustrating embodiments, said signaling diagram illustrates yet another process according to embodiments for performing a transition of a terminal device from a RRC inactive state to a RRC connected state in a power-efficient way. In FIG. 6, the terminal device may be either of the terminal devices 100, 102 of FIG. 1A or the terminal device 150 of FIG. 1B and the anchor and target access nodes may be any of access node 104 of FIG. 1A and access nodes 121, 122, 123, 124, 125 of FIG. 1B. In the following, it is assumed that the anchor and target access nodes are in the same RNA. It should be noted that FIG. 6 corresponds to a somewhat simplified presentation where receiving steps and some simple data processing steps are not explicitly shown for simplicity and clarity.

Referring to FIG. 6, the terminal device is initially operating, in messages 601, in a RRC connected state with the anchor access node. The anchor access node maintains the terminal device context in at least one memory or a database and maintains the terminal device—associated connection with the serving AMF and UPF. The anchor access node determines, in block 602, a need for switching the terminal device from the RRC connected state to the RRC inactive state. In response to the determining of said need for switching, the anchor access node determines, in block 602, a (new) configuration corresponding to the RRC inactive state for the terminal device. The determining of the new configuration in block 602 may specifically comprise determining (or assigning) a RNA for the terminal device and expected latency of incoming RRC messages within said RNA (or specifically one or more values of the expected latency of the incoming RRC messages within said RNA). The expected latency of the incoming RRC messages within said RNA may be determined, for example, based on history information on latency of the incoming RRC messages (at least of the RRC connection resume message) experienced during one or more previous (successful and/or unsuccessful) attempts in switching a terminal device from the RRC inactive state to the RRC connected state within said RNA. Specifically, said history information may comprise one or more measured values of latency of the incoming RRC messages within said RNA. Then, the anchor access node transmits, in message 603, a RRC connection release message comprising a configuration for a RRC inactive state of the terminal device from the anchor access node (and for the releasing of the RRC connection). As described above, the RRC connection release message may comprise a SuspendConfig field. The configuration for the RRC inactive state of the terminal device comprises at least information on a RNA, assigned for the terminal device and the expected latency of the incoming RRC messages within the RNA (i.e., one or more separate values). In response to receiving the RRC connection release message, the terminal device activates, in block 604, the RRC inactive state of the terminal device according to the RRC connection release message (that is, the state is switched from the RRC connected to RRC inactive).

The terminal device reselects, in block 605, from the anchor access node to the target access node and consequently determines a need for resuming the RRC connection (i.e., for triggering the switch back to the RRC connected state).

In contrast to the above embodiments, FIG. 6 illustrates also the (contention-based) random access channel (RACH) procedure carried out before the transmission of the RRC connection resume request. The purpose of the RACH process is to achieve uplink synchronization between the terminal device and the target access node as well as to obtain the resource for the RRC connection request. In the contention-based RACH process, the terminal device, first, transmits, in message 606, a RACH preamble to the target access node (with a certain random pattern or signature). In response to receiving the RACH preamble, the target access node transmits, in message 607, RA response (RAR) back to the terminal device. The RA response comprises information needed for transmitting the RRC connection resume request (e.g., a timing advance value, a temporary C-RNTI and uplink grant for the RRC connection resume request).

After receiving the RA response, the terminal device transmits, in message 608, a RRC connection resume request to the target access node and directly thereafter initiates, in block 609, a timer. The timer (and possibly a low power mode associated with the timer) may be defined as described in relation to any of the previous embodiments. In response to receiving the RRC connection resume request, the target access node transmits, in message 610, a terminal device context retrieval request to the anchor access node. In response to receiving the context retrieval request, the anchor access node retrieves, in block 611, the terminal device context from said at least one memory or database and transmits, in message 612, a terminal device context retrieval response comprising the terminal device context back to the target access node. In response to receiving the terminal device context retrieval response, the target access node stores, in block 613, the terminal device context to at least one memory or a database and transmits, in message 616, a RRC connection resume message to the terminal device.

The terminal device detects, in block 614, the expiration of the timer and initiates, in block 615, the monitoring for receiving the RRC connection resume message. These two steps 614, 615 may preferably occur before the transmission of the RRC connection resume message 616. While monitoring, the terminal device receives the RRC connection resume message. In response to the receiving, the terminal device activates (or initiates), in block 617, the RRC connected state of the terminal device. Further, the terminal device may optionally transmit, in message 618, a RRC connection resume complete message to the target access node acknowledging the completion of the RRC connection process. In some embodiments, the target access node may transmit, in response to receiving the RRC connection resume complete message, a terminal device context release message to the anchor access node for enabling the anchor access node to safely release the terminal device context.

It should be noted that while FIG. 6 illustrates a conventional four-step RACH procedure (the four steps corresponding to messages 606, 607, 608, 616), the embodiments may be equally applied to a two-step RACH procedure. In the two-step RACH procedure, messages 606, 608 and messages 607, 614 form the eponymous two steps. In other words, the terminal device, first, transmits a first message comprising contents of messages 606, 608 (i.e., a random access preamble and the RRC connection resume request) to the target access node and subsequently the target access node transmits a second message comprising the contents of messages 607, 616 (i.e., a RA response and the RRC connection resume message) to the terminal device.

In certain deployments based on network implementation, the terminal device context may be pushed upfront, e.g., to cells in the RNA, when the terminal device enters the RRC inactive state. Therefore, the context retrieval delay is minimized/avoided, at the cost of increased memory requirements for the access node and increased signalling. However, embodiments may still be applicable, because the terminal device may also obtain some energy saving by sleeping while it is waiting for the target access node to process the messages (about 2×3 ms delay) and in any case it would benefit to know when and/or whether the content may be available at a different cell than the anchor cell.

Figure 7:
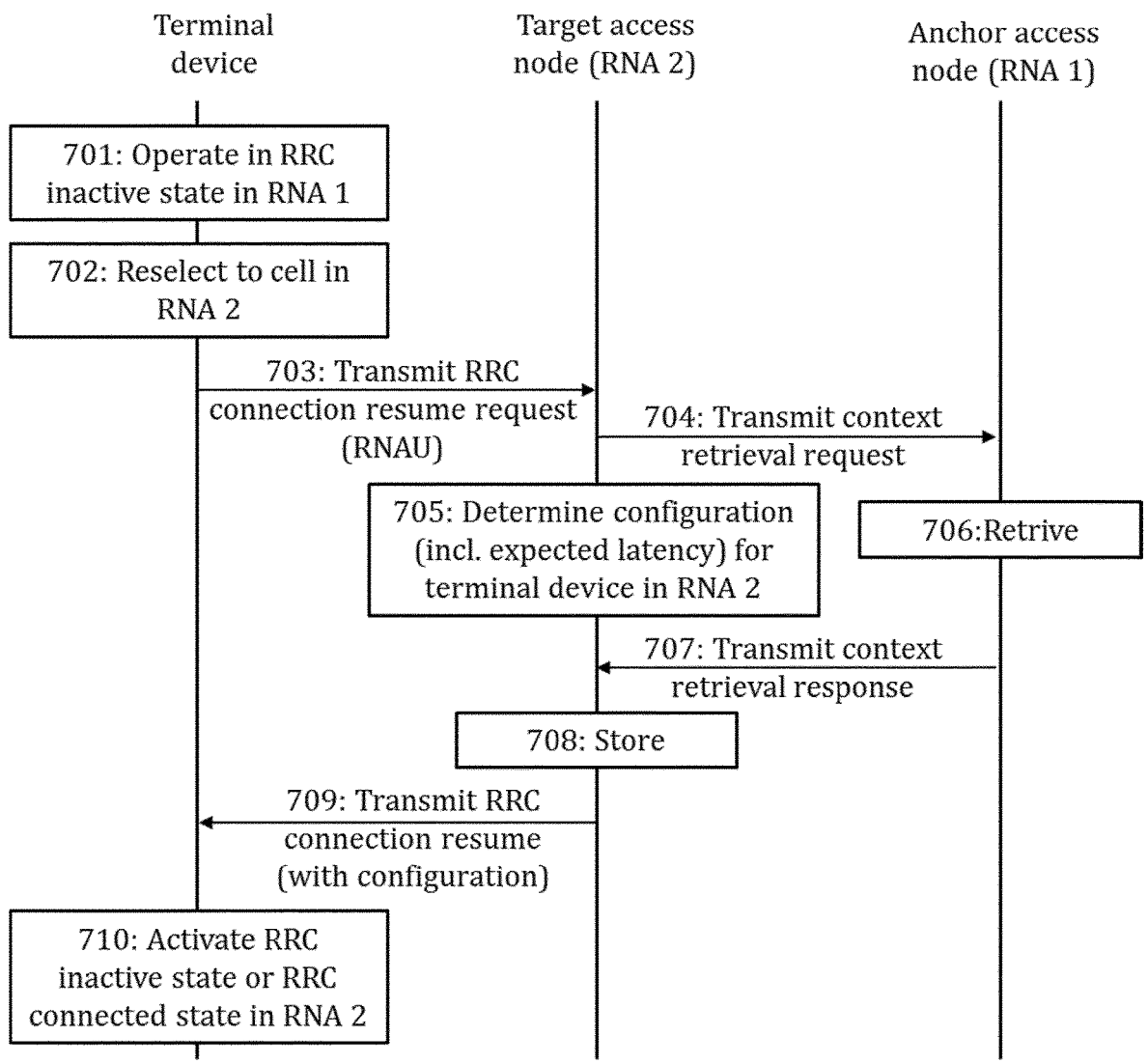

FIG. 7 is a signaling diagram illustrating signaling between a terminal device, an anchor access node located in a first RNA and a target access node located in a second RNA. Said signaling diagram illustrates a process according to embodiments for enabling movement of the terminal device between different RNAs while still maintaining the power-saving delayed monitoring functionalities described in relation to embodiments. In FIG. 7, the terminal device may be either of the terminal devices 100, 102 of FIG. 1A or the terminal device 150 of FIG. 1B and the anchor and target access nodes may correspond to the access node 104 of FIG. 1A and/or to any two access nodes of the access nodes 121, 122, 123, 124, 125 of FIG. 1B located in different RNAs 141, 142. It should be noted that FIG. 7 corresponds to a somewhat simplified presentation where receiving steps and some simple data processing steps are not explicitly shown for simplicity and clarity.

Initially, the terminal device operates, in block 701, in the RRC inactive state in a first RNA (i.e., RNA 1). The terminal device is served by a particular anchor access node which is the anchor access node illustrated in FIG. 7. Then, the terminal device crosses a border of the first RNA. Subsequently, the terminal device reselects, in block 702, to a new cell which is located in a second RNA (i.e., RNA 2), that is, to a new cell not located in the first RNA. In response to reselecting to this new cell located within the second RNA, the terminal device performs, in elements 703 to 710, a RAN-based notification area update, RNAU, procedure for receiving a configuration for the RRC inactive state of the terminal device from a target access node serving said new cell.

Specifically, the RNAU procedure may comprise the following steps. After the reselecting in block 702, the terminal device transmits, in message 703, a RRC connection resume request to a target access node located in said second RNA (and associated with the new cell). In response to receiving the RRC connection resume request, the target access node transmits, in message 704, a context retrieval request for retrieving the terminal device context to the anchor access node located in the first RNA. In response to receiving the context retrieval request, the anchor access node retrieves the terminal device context of the terminal device from at least one memory and transmits, in message 707, a context retrieval response comprising said terminal device context back to the target access node. In response to receiving the context retrieval response, the target access node stores, in block 708, the terminal device context to at least one memory of the target access node.

In parallel, before or after the context retrieval process in block 704, 706 to 708, the target access node determines, in block 705, a new configuration for the RRC inactive state of terminal device. Said new configuration comprises at least information on the second RNA assigned for the terminal device (i.e., the RNA associated with the target access node) and on an expected latency of incoming RRC messages (e.g., of an RRC connection resume message) within said second RNA. The target access node may store, in block 708, also said new configuration to said at least one memory of the target access node.

It should be noted that while the processes described in relation to blocks 703, 704, 706, 707, 708 correspond to the conventional terminal device context retrieval process described in relation to previous embodiments (e.g., FIG. 6), the processes described in the previous paragraph may be carried out only if the anchor access node is associated with a RNA other than the (second) RNA associated with the target access node.

The target access node transmits, in message 709, a RRC connection resume message comprising the new configuration of the terminal device to the terminal device. After receiving the RRC connection resume message, the terminal device may activate, in block 710, the RRC connected state for said second RNA (with the target access node acting as the new anchor access node). Alternatively, the terminal device may activate, in block 710, the RRC inactive state for said second RNA. The RRC connected state may specifically be activated at least in the case that the reselection in block 702 (explicitly) triggered a switch from the RRC inactive state to the RRC connected state.

Figure 8:
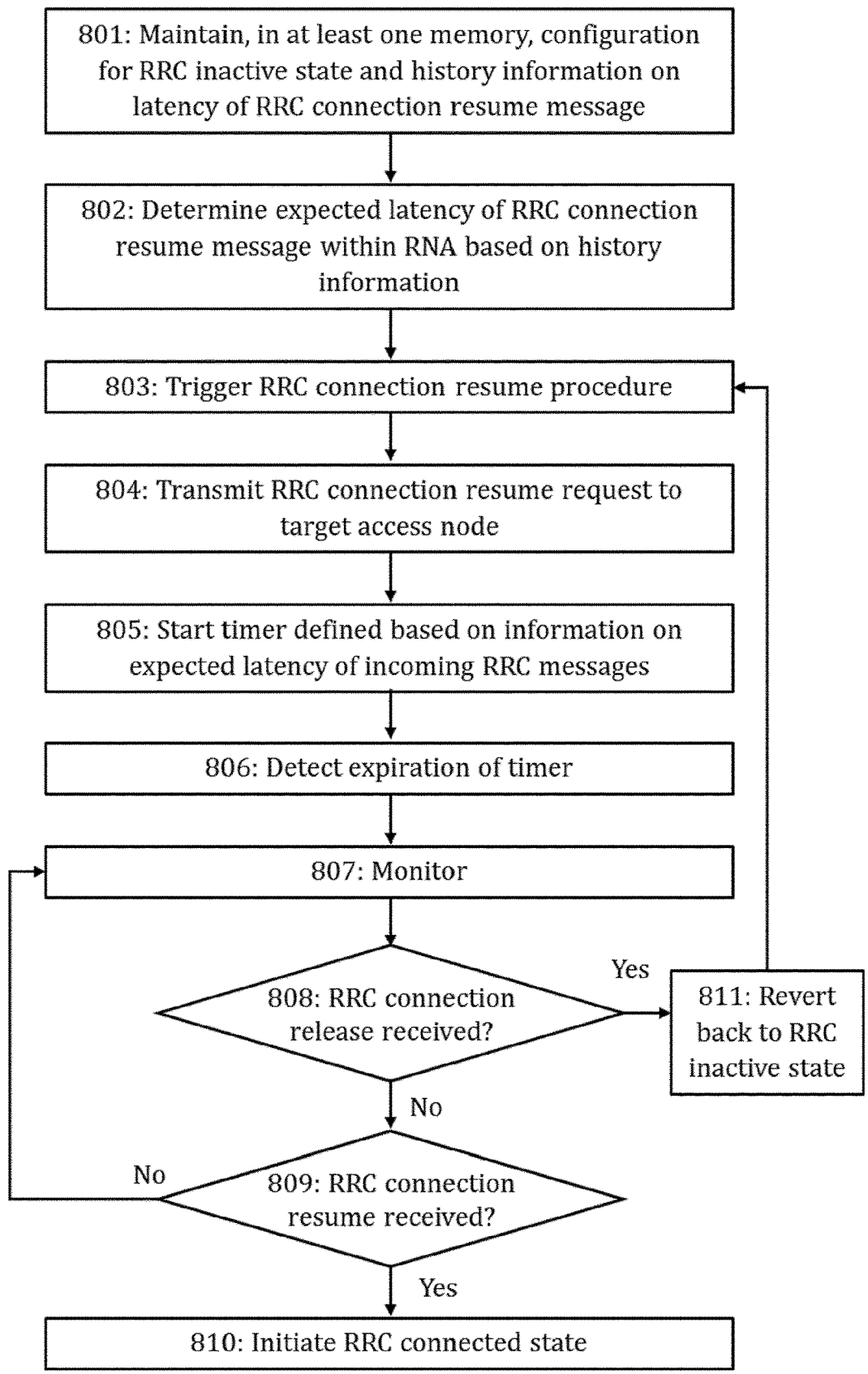

FIG. 8 illustrates another process according to embodiments for performing a transition of a terminal device from a RRC inactive state to a RRC connected state in a way that minimizes the power consumption of the terminal device. Similar to FIGS. 2 to 5, the illustrated process may be performed by a terminal device or more specifically either of the terminal devices 100, 102 of FIG. 1A or the terminal device 150 of FIG. 1B. Specifically, FIG. 8 illustrates an alternative to embodiments illustrated in FIG. 3 or equally another implementation of the process of FIG. 2.

FIG. 8 corresponds for the most part to FIG. 2. Namely, blocks 803 to 807, 809, 810 may correspond, respectively, to blocks 203 to 209 of FIG. 2. The following discussion on FIG. 8, thus, concentrates on the new features introduced in blocks 801, 802, 808, 811.

Referring to FIG. 8, the terminal device maintains, in block 801, in said at least one memory, not only a configuration for a RRC inactive state of the terminal device (as in block 201 of FIG. 2) but also history information on latency of incoming RRC messages (e.g., on latency of a RRC connection resume message) experienced during one or more previous attempts in switching the terminal device from the RRC inactive state to the RRC connected state within said RNA. Specifically, said history information may comprise one or more measured values of latency of the incoming RRC messages (at least of a RRC connection resume message) within said RNA. As in previous embodiments, the configuration comprises at least information on a RNA assigned for the terminal device (and optionally on an anchor access node of the terminal device).

The terminal device determines, in block 802, the expected latency of the incoming RRC message within the RNA based on the history information. In other words, the terminal device calculates the expected latency of the incoming RRC messages within the RNA based on one or more measured values of latency of the incoming RRC messages. For example, this calculation may be an average, a weighted average or a minimum of said one or more measured values. The latency of the incoming RRC messages may correspond, here, specifically to a latency of a RRC connection resume message, a latency of a RRC connection release message or a latency of a RRC connection resume/release message.

In some embodiments, the collecting of the history information used for determining the expected latency of the incoming RRC messages may be carried out as follows. During an initial measurement phase, the terminal device may not employ a low power mode in-between the transmitting of the RRC connection resume request (block 804) and the receiving of the RRC connection resume or release (in block 808 or 809) for a pre-defined number (consecutive) RRC Inactive to RRC Connected transitions. This enables the terminal device to measure the latency of the incoming RRC messages said pre-defined number of times, that is, to collect (history) information regarding the latency of the incoming RRC messages. When the terminal device starts operating according to the process of FIG. 8 (i.e., after the pre-defined number of RRC inactive to RRC connected transitions have been carried out and thus said initial measurement phase is over), it may still continue to update its estimates of the latency of the RRC messages based on the newly measured values. Specifically, a moving average may be employed here. Any of the measured values (during the initial measurement phase and/or thereafter) may be stored to at least one memory of the terminal device upon measuring.

After determining the expected latency of the incoming RRC messages in block 802, the terminal device may carry out the switching from RRC inactive state to RRC connected state in blocks 803 to 807 as described in relation to previous embodiments.

In FIG. 8, while monitoring RRC transmissions according to block 807, the terminal device may receive, instead of a RRC connection resume message (as in block 809), a RRC connection release message (in block 808). In response to receiving the RRC connection release message in block 808, the terminal device may revert (or return), in block 811, back to the RRC inactive state. In other words, the switching to the RRC connected state (and the monitoring) may be effectively cancelled or aborted in this case.

In some embodiments, blocks 808, 810 may be omitted so that block 807 leads directly to block 809. In other words, the monitoring functionalities may correspond to blocks 207 to 209 of FIG. 3 or block 307 to 309 of FIG. 3. Conversely, the features discussed in relation to blocks 808, 810 may be implemented in any of the above embodiments in a corresponding manner.

In some embodiments, while monitoring RRC transmissions according to block 807, the terminal device may receive, instead of a RRC connection resume message or a RRC connection release message, a RRC setup message for RRC connection establishment. This may be the case, for example, when the terminal device context cannot be retrieved at the network side.

The embodiments discussed above may be employed, in some alternative embodiments, in connection with small data transmission (SDT). In the SDT approach, user-plane data is transmitted together with a RRC Connection Resume Request (e.g., in block 204 of FIG. 2, block 304 of FIG. 3, block 404 of FIG. 4, block 505 of FIG. 5, in message 608 of FIG. 6, in message 703 of FIG. 7 or in block 804 of FIG. 8) and is ciphered as per security keys in the stored terminal device context. Also, in the case of a SDT transmission, the terminal context retrieval would be necessary if the terminal device accesses a different cell.

The blocks, related functions, and information exchanges described above by means of FIGS. 2 to 8 are in no absolute chronological order, and some of them may be performed simultaneously or in an order differing from the given one. In some embodiments, some of the steps may be neglected, for example, if the relevant information is already available (e.g., stored to a memory).

Figure 9:
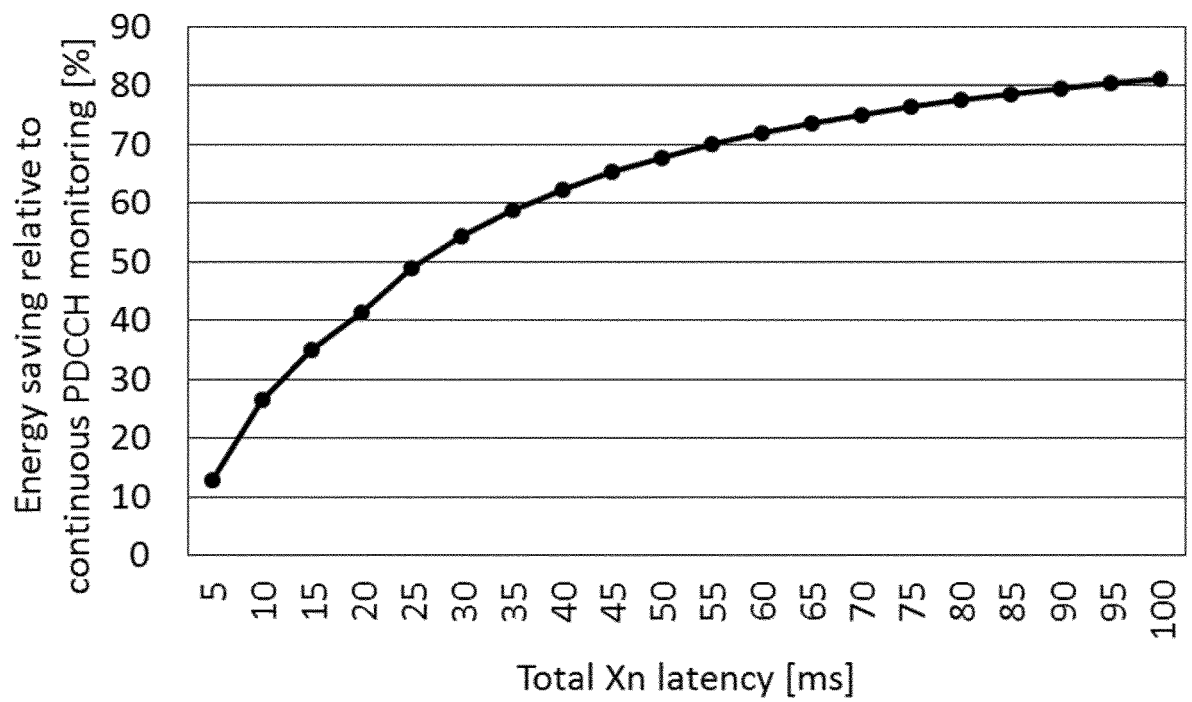
FIG. 9 illustrates energy saving in percent for the overall RRC resume connection as a function of the total Xn latency achieved when utilizing micro/light/deep sleep modes according to embodiments.

The one of the main advantages of the embodiments may be considered the minimization of the unnecessary terminal device power spent for continuous (PDCCH) monitoring between the RRC connection resume request and the RRC connection resume message (or other RRC message transmitted in response to the RRC connection resume request). The potential terminal device power saving for the entire resume procedure when applying any of the embodiments (as compared to the baseline of continuous PDCCH monitoring between the RRC connection resume request and the RRC connection resume message) is provided in FIG. 9 for different values of total Xn latency (i.e., round trip time+ optionally processing times), ranging from 5 ms to 100 ms (i.e., one-way Xn latency ranging from 2.5 ms to 50 ms). In FIG. 9, it is assumed that the terminal device is able to employ a micro, light and deep sleep states based on the expected latency, as discussed in detail in relation to FIG. 4. For short latencies (<10 ms), the terminal device is only able to use micro sleep and thus savings of 10-15% are achieved, but for latencies in the order of 10-20 ms light sleep is applicable resulting in 25-40% energy saving for the entire resume procedure. When the latency exceeds 20 ms the very efficient deep sleep can be used by the terminal device and thus the energy savings exceed 50% and approach 80% for long Xn delays. In light of the fact that typically the one-way X2 latency of current LTE deployment is in the order of 20 ms, a significant terminal device power saving can be achieved.

Figure 10:
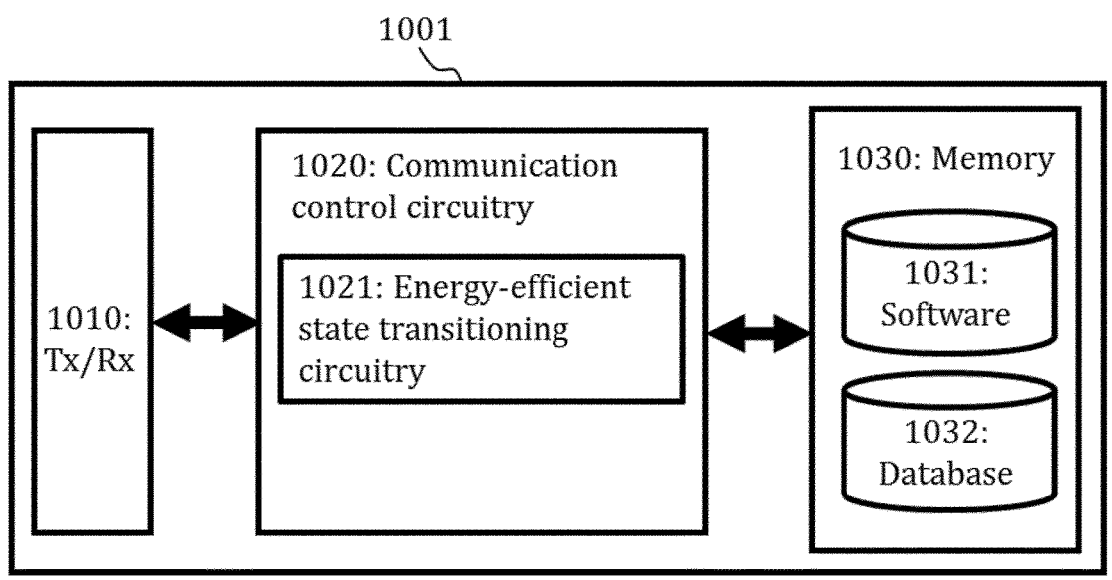
FIGS. 10 and 11 illustrate apparatuses according to embodiments.

FIG. 10 illustrates an apparatus 1001 configured to carry out the functions described above in connection with a terminal device. The apparatus may, for example, correspond to any of the terminal devices 100, 102 of FIG. 1A and the terminal device 150 of FIG. 1B. The apparatus may be an electronic device comprising electronic circuitries. The apparatus may be a separate network entity or a plurality of separate entities. The apparatus may comprise a communication control circuitry 1020, such as at least one processor, and at least one memory 1030 including a computer program code (software) 1031 wherein the at least one memory and the computer program code (software) are configured, with the at least one processor, to cause the apparatus to carry out any one of the embodiments of the terminal device described above.

The memory 1030 may comprise a database 1032 which may comprise information on, for example, one or more configurations for the RRC inactive state of the terminal device for one or more RNAs. Each configuration comprises at least information on a RNA and an expected latency of incoming RRC messages within said RNA, as described in previous embodiments. The database may, also or alternatively, comprise information one or more low power modes (e.g., one or more latency thresholds for triggering a given threshold). The memory 1030 may also comprise other databases which may not be related to the described measurement and topology configuration functionalities according to embodiments.

Referring to FIG. 10, the communication control circuitry 1020 may comprise energy-efficient state transitioning circuitry 1021. The energy-efficient state transitioning circuitry 1021 may be configured to enable energy-efficient transitioning of the terminal device from the RRC inactive state to the RRC connected state. The energy-efficient state transitioning circuitry 1021 may be configured, for example, to carry out at any of the processes of FIGS. 3 to 6 and 8 and/or any of the processes performed by the terminal device in FIGS. 6 and 7.

Figure 11:
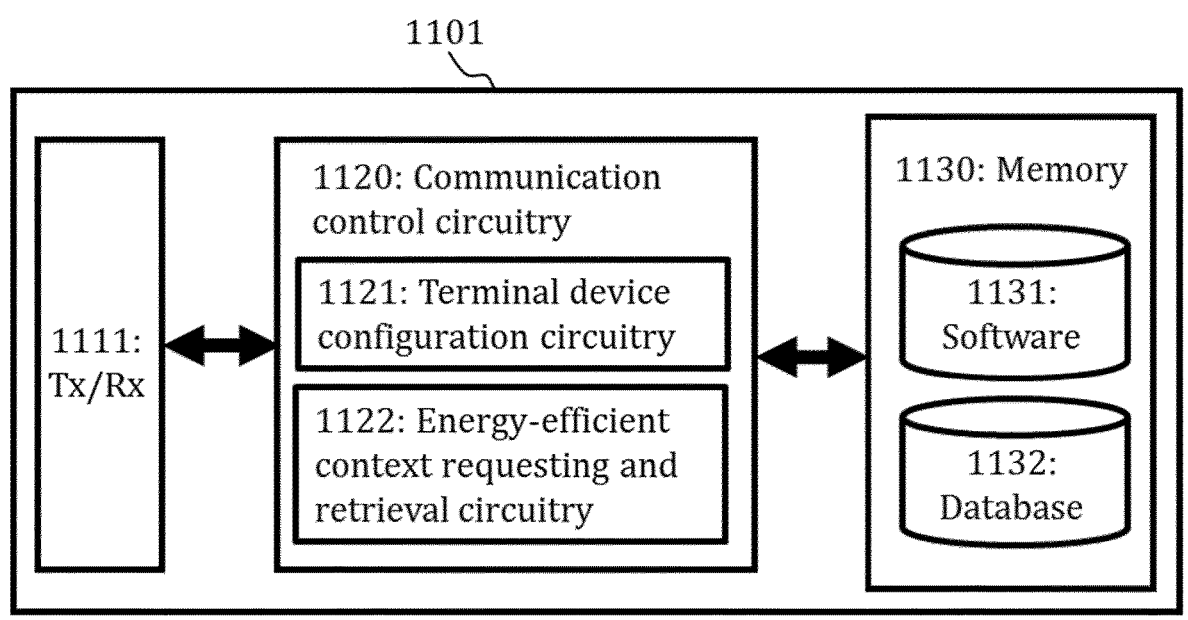

FIG. 11 illustrates an apparatus 1101 configured to carry out the functions described above in connection with an access node. The apparatus may, for example, correspond to any of the access node 104 of FIG. 1A and the access nodes 121, 122, 123, 124, 125 of FIG. 1B. The apparatus may specifically be a gNB or eNB. The apparatus may be an electronic device comprising electronic circuitries. The apparatus may be a separate network entity or a plurality of separate entities. The apparatus may comprise a communication control circuitry 1120 such as at least one processor, and at least one memory 1130 including a computer program code (software) 1131 wherein the at least one memory and the computer program code (software) are configured, with the at least one processor, to cause the apparatus to carry out any one of the embodiments of the access node described above.

The memory 1130 may comprise a database 1132 which may comprise, for example, information on terminal device context of terminal devices (if any) the access node is currently serving and/or on at least one RNA of which the access node forms a part, as described in previous embodiments. The memory 1130 may also comprise other databases which may not be related to the functionalities of the network node according to any of presented embodiments such as any databases used by relay or donor nodes in conventional operation.

Referring to FIG. 11, the communication control circuitry 1120 may comprise terminal device configuration circuitry 1121 configured to configure terminal devices to perform transitioning to the RRC connected state in an energy-efficient manner according to any of presented embodiments. The measurement circuitry 1121 may be configured to carry out at least some of actions relating to elements blocks 602, 603 of FIG. 6 and block 705 of FIG. 7. The communication control circuitry 1120 may further comprise energy-efficient context requesting and retrieval circuitry 1122 for requesting terminal device context from an anchor access node (i.e., the last serving access node) and retrieving a terminal device context when requested by a target access node (i.e., a new serving access node) and receiving said terminal device context and transmitting said terminal device context to the target access node. The energy-efficient context requesting and retrieval circuitry 1122 may be configured to carry out at least some of actions relating to elements blocks 610 to 613, 616 of FIG. 6 and blocks 704, 706, 707, 708, 709 of FIG. 7.

The apparatuses 1001, 1101 described in relation to FIGS. 10 and 11 may further comprise communication interfaces (Tx/Rx) 1010, 1110 comprising hardware and/or software for realizing communication connectivity according to one or more communication protocols. The communication interface may provide the apparatus with communication capabilities to communicate in the cellular communication system and enable communication, for example, with network nodes and terminal devices. Specifically, the communication interfaces 1010 of FIG. 10 may enable communication with one or more access nodes (and possibly with the AMF) and the communication interfaces 1110 of FIG. 11 may enable communication with one or more terminal devices and one or more core network elements (e.g., the AMF and/or the UPF). The communication interface 1010, 1110 may comprise standard well-known components such as an amplifier, filter, frequency-converter, (de)modulator, and encoder/decoder circuitries and one or more antennas. The communication interface 1010, 1110 may comprise radio interface components providing the apparatus with radio communication capability in the cell.

The memories of the apparatuses described in relation to FIGS. 10 and 11 may be implemented using any suitable data storage technology, such as semiconductor based memory devices, flash memory, magnetic memory devices and systems, optical memory devices and systems, fixed memory and removable memory.

As used in this application, the term "circuitry may refer to one or more or all of the following:
  (a) hardware-only circuit implementations (such as implementations in only analog and/or digital circuitry) and
  (b) combinations of hardware circuits and software, such as (as applicable):
    (i) a combination of analog and/or digital hardware circuit(s) with software/firmware and
    (ii) any portions of hardware processor(s) with software (including digital signal processor(s)), software, and memory(ies) that work together to cause an apparatus, such as a mobile phone or server, to perform various functions) and
  (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In an embodiment, at least some of the processes described in connection with FIGS. 2 to 9 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 2 to 9 or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chipset (procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 2 to 9 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the embodiments have been described above with reference to an example according to the accompanying drawings, it is clear that the embodiments are not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A terminal device comprising:
at least one processor; and
at least one non-transitory memory including computer program code;
the at least one memory and the computer program code configured to, with the at least one processor, cause the terminal device at least to perform:
maintaining, in said at least one memory, a configuration for a radio resource control inactive state of the terminal device, wherein the configuration comprises at least information on a radio access network notification area assigned for the terminal device;
acquiring information on an expected latency of incoming radio resource control messages within the radio access network notification area; and
in response to triggering a radio resource control connection resume procedure, performing the following:
transmitting a radio resource control connection resume request to a target access node,
starting a timer defined based on the information on the expected latency of the radio resource control messages,
in response to the timer expiring, initiating monitoring of incoming radio resource control messages, and
in response to receiving a radio resource control connection resume message from the target access node, activating a radio resource control connected state of the terminal device.

2. The terminal device of claim 1, wherein the expected latency of the incoming radio resource control messages within the radio access network notification area corresponds to an expected latency of a radio resource control connection resume message within the radio access network notification area or to an expected latency of two or more different radio resource control messages consisting of a radio resource control connection resume message and at least one of a radio resource control connection release message or a radio resource control setup message within the radio access network notification area.

3. The terminal device of claim 1, wherein the acquiring comprises:
receiving, when the terminal device is in the radio resource control connected state served with an anchor access node, a radio resource control connection release message comprising the configuration for the radio resource control inactive state of the terminal device from the anchor access node, wherein the configuration comprises, in addition to the information on the assigned radio access network notification area for the terminal device, an expected latency of incoming radio resource control messages within the radio access network notification area,
wherein the at least one memory and the computer program code are configured to, with the at least one processor, further cause the terminal device to perform:
activating the radio resource control inactive state of the terminal device according to the radio resource control connection release message.

4. The terminal device of claim 1, wherein the at least one memory and the computer program code are configured to, with the at least one processor, further cause the terminal device to perform:
maintaining, in said at least one memory, history information on latency of incoming radio resource control messages as experienced during one or more previous attempts in switching the terminal device from the radio resource control inactive state to the radio resource control connected state within said radio access network notification area,
wherein the acquiring comprises:
determining the expected latency of the incoming radio resource control messages within the radio access network notification area based on the history information.

5. The terminal device according to claim 1, wherein the at least one memory and the computer program code are configured to, with the at least one processor, further cause the terminal device to perform:
initiating, in response to the starting of the timer, a low power mode of the terminal device; and terminating the low power mode in response to the timer expiring.

6. The terminal device of claim 5, wherein the at least one memory and the computer program code are configured to, with the at least one processor, further cause the terminal device to perform:
selecting the low power mode from a plurality of low power modes based on the information on the expected latency for the incoming radio resource control messages within the radio access network notification area, wherein the plurality of low power modes comprise one or more micro sleep modes, one or more light sleep modes and/or one or more deep sleep modes.

7. The terminal device according to claim 1, wherein the timer is defined to have an expiration time corresponding to a value of the expected latency of the incoming radio resource control messages determined based on a current location of the terminal device within the radio access network notification area, the current location being defined based on a current cell of the terminal device and/or a current beam of the terminal device.

8. The terminal device according to claim 1, wherein said configuration for the radio resource control inactive state of the terminal device comprises information on an anchor access node of the terminal device and the at least one memory and the computer program code are configured to, with the at least one processor, further cause the terminal device to perform, in response to the triggering of the switch from the radio resource control inactive state to the radio resource control connected state:
determining whether the terminal device is still served with the anchor access node;
in response to the terminal device being still served with the anchor access node, initiating monitoring of the incoming radio resource control messages following the transmitting of the radio resource control connection resume request to the target access node which correspond to the anchor access node; and
performing the starting of the timer and the initiating of the monitoring responsive to the timer expiring only in response to the terminal device being served with an access node other than the anchor access node.

9. The terminal device according to claim 1, wherein said configuration for the radio resource control inactive state of the terminal device comprises information on an anchor access node of the terminal device, the information on the expected latency of the incoming radio resource control messages comprises one or more values of the expected latency for one or more anchor cells associated with an anchor access node and one or more values of the expected latency for one or more non-anchor cells of the radio access network notification area, the one or more values of the expected latency for the one or more anchor cells being smaller than the one or more values of the expected latency for the one or more non-anchor cells, the at least one memory and the computer program code being configured to, with the at least one processor, further cause the terminal device to perform, in response to the triggering of the switch from the radio resource control inactive state to the radio resource control connected state:
determining whether the terminal device is still served with the anchor access node; and
defining the timer based on the information on the expected latency of the incoming radio resource control messages taking into account whether or not the terminal de vice is served with the anchor access node.

10. The terminal device according to claim 1, wherein the information on the expected latency of the incoming radio resource control messages comprises a separate value of the expected latency for each of one or more cells of the radio access network notification area and/or each of one or more radio access network area codes in the radio access network notification area.

11. The terminal device according to claim 1, wherein each value of the expected latency of the incoming radio resource control messages corresponds to a minimum value of a sum of processing delays and Xn round-trip time associated with any two access nodes in the radio access network notification area.

12. The terminal device according to claim 1, wherein each value of the expected latency of the incoming radio resource control messages corresponds to an exact value indicating an exact time at which the terminal device expects the resume message response, the exact value being defined with the highest Xn round-trip time between any two access nodes in the radio access network notification area.

13. The terminal device according to claim 1, wherein the at least one memory and the computer program code are configured to, with the at least one processor, further cause the terminal device to perform:
in response to reselecting to a new cell located not located within the current radio access network notification area, performing a radio access network-based notification area update procedure for receiving a new configuration for the radio resource control inactive state of the terminal device from a new target access node associated with the new cell, wherein the new configuration comprises at least information on a new radio access network notification area as signed for the terminal device and an expected latency of incoming radio resource control messages within the new radio access network notification area.

14. A method comprising:
maintaining, in at least one memory, a configuration for a radio resource control inactive state of a terminal device, wherein the configuration comprises at least information on a radio access network notification area assigned for the terminal device;
acquiring information on an expected latency of incoming radio resource control messages within the radio access network notification area; and
in response to triggering a radio resource control connection resume procedure, performing the following:
transmitting a radio resource control connection resume request to a target access node,
starting a timer defined based on the information on the expected latency of the incoming radio resource control messages,
in response to the timer expiring, initiating monitoring of incoming radio resource control messages, and
in response to receiving a radio resource control connection resume message from the target access node, activating a radio resource control connected state of the terminal device.

15. A non-transitory computer readable medium embodied with a computer program comprising instructions stored thereon for performing the method as claimed in claim 14.

* * * * *